No. 623,893. Patented Apr. 25, 1899.
T. FAIRLEY.
PROCESS OF MAKING AMMONIUM NITRATE.
(Application filed Dec. 29, 1897.)
(No Model.)
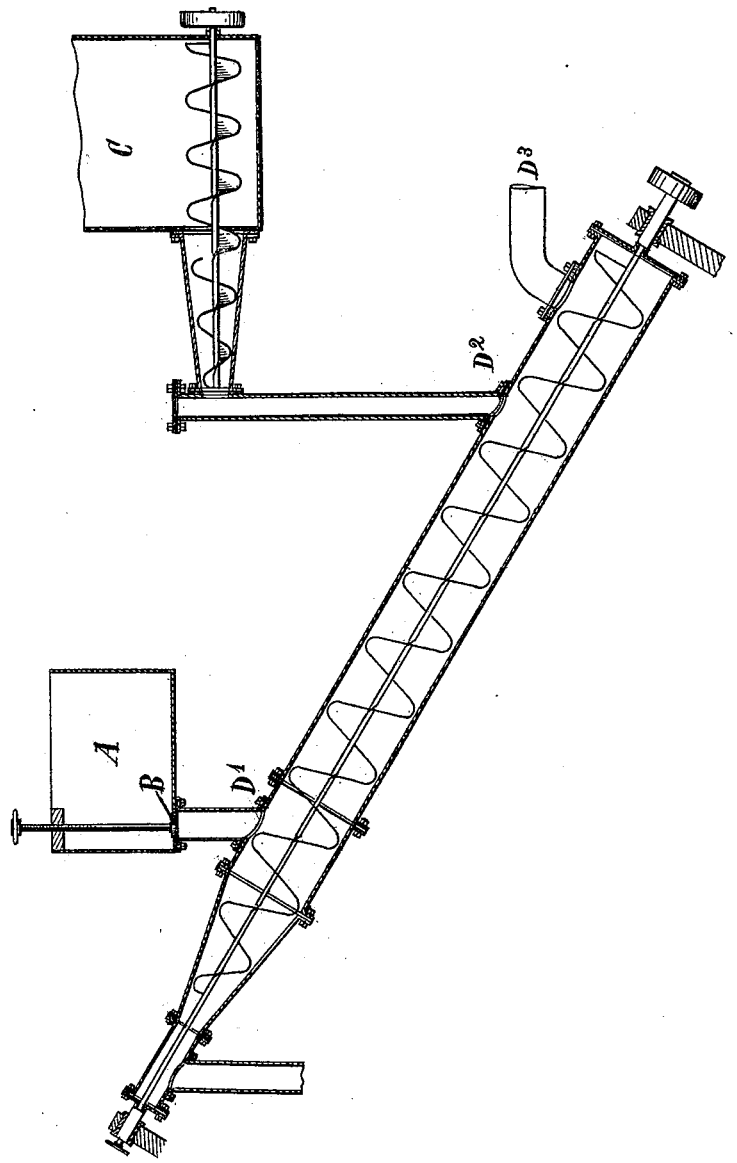
WITNESSES:
M. Duncan.
P. F. Logue.
INVENTOR
Thomas Fairley
BY
L. K. Böhm
ATTORNEY.

UNITED STATES PATENT OFFICE.

THOMAS FAIRLEY, OF LEEDS, ENGLAND.

PROCESS OF MAKING AMMONIUM NITRATE.

SPECIFICATION forming part of Letters Patent No. 623,893, dated April 25, 1899.

Application filed December 29, 1897. Serial No. 664,403. (No specimens.)

*To all whom it may concern:*

Be it known that I, THOMAS FAIRLEY, a subject of the Queen of England, residing at Leeds, England, have invented certain new and useful Improvements in the Manufacture of Ammonium Nitrate, (for which I have obtained Letters Patent in England, No. 1,668, dated January 23, 1896; in France, No. 262,851, dated January 6, 1897, and in Belgium, No. 125,634, dated January 9, 1897,) of which the following is a specification.

In the reaction of ammonia and carbon dioxide on saturated solutions of sodium nitrate or of ammonium bicarbonate on sodium nitrate about two-thirds of the sodium nitrate is changed into ammonium nitrate and about one-third of the sodium nitrate remains no matter what excess of ammonium bicarbonate or of the components of ammonium bicarbonate may be used. The process therefore gives sodium bicarbonate, which can be readily purified; but hitherto ammonium nitrate has not been obtained free from sodium salts by this means.

The object of this invention is to supply a simple means for the manufacture of practically pure ammonium nitrate from this source.

The process may be carried out in any suitable screw conveyer, and for an illustration a plain screw conveyer is illustrated in the accompanying drawing, in which the action of sodium-nitrate solution on ammonium bicarbonate may take place. The sodium-nitrate solution is contained in tank A and is fed in by plug-tap B. The ammonium bicarbonate is contained in vessel C, to the right. This vessel C is either charged with moist ammonium bicarbonate or it forms the bottom part of the apparatus in which ammonium bicarbonate is produced from the gases carbon dioxide and ammonia in presence of water. The conical part of the feeding-screw in C acts as a screw-press to keep back the liquid and send on the partly-moist solid, which enters the conversion apparatus at D². This apparatus is a cylinder set obliquely, armed with a screw conveyer. The solid ammonium bicarbonate is slowly conveyed upward, meeting the liquid sodium-nitrate solution, flowing downward when the reaction occurs:

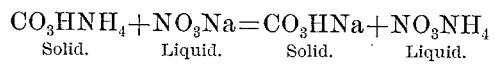
$$CO_3HNH_4 + NO_3Na = CO_3HNa + NO_3NH_4$$
Solid.　　Liquid.　　Solid.　　Liquid.

to the extent of two-thirds of the sodium nitrate present. The sodium carbonate passes upward past D' and in the conical part at the upper end is pressed free from much of the liquid containing $NaNO_3$, which goes back to act on fresh $NH_4HCO_3$. The liquid mixture of ammonium nitrate and sodium nitrate $NH_4NO_3$ and $NaNO_3$ passes below D² and filters through D³ to a refrigerating apparatus. The liquid after refrigerating and separating out the ammonium nitrate is caused first to give up its cold to the next portion of liquid to be refrigerated and is then used, along with the washings, to dissolve fresh portions of the materials to be operated on.

Any other of the arrangements used in the ammonia-soda process may be applied to the conversion of sodium nitrate, so as to give ammonium nitrate and sodium bicarbonate—for instance, the processes described in Wirth's British specification No. 2,174 of 1875 and Chance's British specification No. 5,919 of 1885.

To facilitate the process for the purification of the ammonium nitrate, the solutions should be obtained with the minimum quantity of water necessary in the reaction of sodium nitrate on ammonium bicarbonate or its components. Weak liquors must be concentrated by evaporation or by the addition of the solid salts from the complete evaporation of another portion of the liquid. On exposing such liquids to cold in an apparatus externally cooled to a temperature of about −15° centigrade the greater part of the ammonium nitrate crystallizes out, while the other salts remain in solution. This cooling process may be carried out in an apparatus similar to that previously referred to, in which case the liquid is supplied at the bottom and the ammonium nitrate is delivered at the upper end and can be purified by washing with cold water or with a cold saturated solution of ammonium nitrate. The salt may be dried by exposure to a gentle heat with or without the aid of a hydro-extractor. The liquid remaining from the cooling process is used to dissolve fresh quantities of sodium nitrate to be used as in the ammonia-soda process.

In the absence of cheaper or more convenient means of obtaining low temperatures for the cooling process the solution of ammonium nitrate in its own weight of water can be employed as a cooling agent. It is not necessary for this purpose to use pure ammonium nitrate, as the impure nitrate obtained by the evaporation of the liquid from the ammonia-soda process applied to sodium nitrate, as above described, is preferable to the pure salt. This can be dissolved directly in the liquid and be cooled without altering the relative proportions of the salts in the liquid, and the cooling effect is applied in the most direct manner possible, so that less external refrigeration is necessary.

The above process is an application of the fact that below a certain temperature sodium nitrate is more soluble in water than ammonium nitrate, and the process can be applied to mixtures of solid ammonium and sodium nitrates by dissolving them in the minimum quantity of water or, as above mentioned, in the liquor from the application of the ammonia-soda process to sodium nitrate.

Having thus described my invention, what I claim therein as new, and desire to secure by Letters Patent, is—

The process of manufacturing ammonium nitrate consisting in subjecting bicarbonate of ammonium to the action of a saturated solution of nitrate of sodium, then separating the liquid from the moistened solid and then subjecting the liquid to refrigeration thereby crystallizing out the nitrate of ammonium, substantially as described.

In testimony whereof I have hereto set my hand in the presence of the two subscribing witnesses.

THOMAS FAIRLEY.

Witnesses:
BENJAMIN ARTHUR BURRELL,
JOHN HENRY SUGDEN.